(No Model.)
S. ELLIOTT.
DEVICE FOR TRANSMITTING DIFFERENT SPEEDS.
No. 418,281. Patented Dec. 31, 1889.
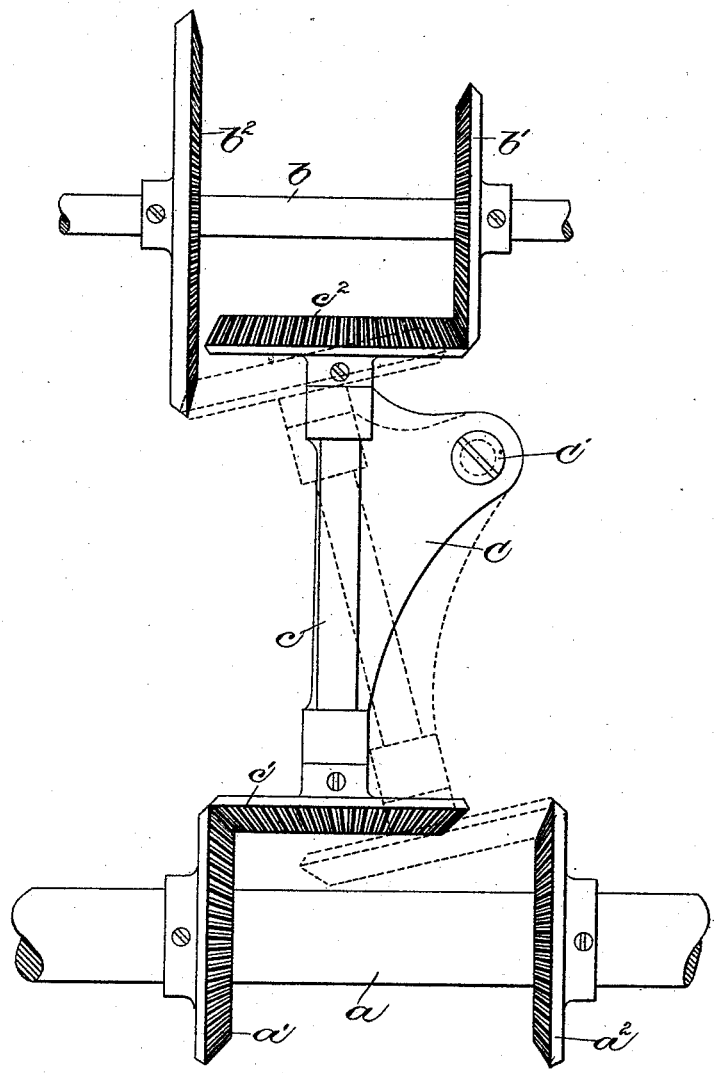

UNITED STATES PATENT OFFICE.

STERLING ELLIOTT, OF NEWTON, MASSACHUSETTS.

DEVICE FOR TRANSMITTING DIFFERENT SPEEDS.

SPECIFICATION forming part of Letters Patent No. 418,281, dated December 31, 1889.

Application filed June 23, 1887. Serial No. 242,258. (No model.)

*To all whom it may concern:*

Be it known that I, STERLING ELLIOTT, of Newton, county of Middlesex and State of Massachusetts, have invented an Improvement in Device for Transmitting Different Speeds, of which the following description, in connection with the accompanying drawing, is a specification, like letters on the drawing representing like parts.

This invention has for its object to construct a device for transmitting different speeds, whereby a shaft may at will be driven at a greater or less speed with relation to the driving-shaft.

In accordance with this invention a driving-shaft provided with two toothed wheels, either of the same or different diameters, and a driven shaft also provided with two toothed wheels of the same or different diameters, that depending upon whether the toothed wheels of the driving-shaft are or are not of the same diameter, have co-operating with them an intermediate shaft carrying two toothed wheels, one of which engages one or the other of the wheels of the driving-shaft, and the other of which engages one or the other of the wheels of the shaft to be driven. As a preferable way to effect change of position of the wheels of the intermediate shaft, in order that the wheels may be made to engage one or the other of the wheels of the driving and driven shafts, the intermediate shaft is mounted in a pivoted bearing-frame, so that by turning the said frame on its pivot the wheels of the intermediate shaft may be made to engage either of the two wheels of both the driving and driven shafts.

The drawing shows in plan view a variable speed-transmitting device embodying this invention.

The driving-shaft $a$ has secured to it two toothed wheels $a'$ $a^2$, herein shown as beveled gears of the same diameter placed near each other. The shaft $b$, to be driven and called the "driven shaft," has also secured to it two toothed wheels $b'$ $b^2$, of different diameters, herein shown as beveled gears located near each other. The shafts $a$ $b$ are arranged substantially parallel with relation to each other. The intermediate shaft $c$, arranged between the shafts $a$ $b$, has secured to each end there- of a toothed wheel $c'$ $c^2$, herein shown as beveled gears of the same diameter, the teeth of which are adapted to mesh with the teeth of the beveled gears on both the shafts $a$ and $b$. The intermediate shaft $c$ has its bearings in a frame or carrier C, pivoted at C'. When the frame C is in one position—such, for instance, as designated by the full lines—the shaft $c$ lies at right angles with relation to the shafts $a$ $b$, the beveled gear $c'$ meshes with the beveled gear $a'$, the beveled gear $c^2$ meshes with the beveled gear $b'$, and as the shaft $a$ is rotated the shaft $b$ will be driven at a defined speed with relation to the shaft $a$. When the frame or carrier C is turned into its dotted-line position, the beveled gear $c'$ will be disengaged from the beveled gear $a'$ and made to engage the beveled gear $a^2$, the bevel-gear $c^2$ will be disengaged from the bevel-gear $b'$ and made to engage the bevel-gear $b^2$, and as the gear $b^2$ is of larger or different diameter the shaft $b$ will be rotated at a slower or different speed with relation to the shaft $a$.

It is obvious that, if desired, all the toothed wheels may be made of different diameters, that depending upon the amount of variation required, and while I have herein shown a pivoted frame C for the intermediate shaft, it may be made movable in any other manner, the essential feature being that the wheels carried by the intermediate shaft shall be made to engage one or the other of two of the wheels, carried by two other parallel shafts.

I claim—

1. In a device for transmitting different speeds, two shafts, each of which has two toothed wheels, the toothed wheels of one of the shafts being of different diameter from each other, combined with an intermediate shaft carrying two toothed wheels which respectively are adapted to alternately co-operate with the wheels of the two shafts, substantially as described.

2. In a device for transmitting different speeds, a driving-shaft and a driven shaft, each shaft having two toothed wheels upon it, combined with an intermediate shaft having two toothed wheels and adapted to move angularly with relation to the said shafts, in order that the wheels at the opposite ends of the intermediate shaft may be made to engage alternately one or the other of the wheels on the driving and driven shaft, respectively, substantially as described.

3. In a device for transmitting different speeds, the shaft $a$, having two toothed wheels thereon, and another shaft, as $b$, having two toothed wheels thereon, the wheels of one of the said shafts being of different diameter with relation to each other, combined with an intermediate shaft having two toothed wheels, one of which engages one or the other of the two toothed wheels of the shaft $a$, and the other of which engages one or the other of the two toothed wheels of the shaft $b$, substantially as described.

In testimony whereof I have signed my name to this specification in the presence of two subscribing witnesses.

STERLING ELLIOTT.

Witnesses:
BERNICE J. NOYES,
F. L. EMERY.